United States Patent
Yokota

(10) Patent No.: US 8,885,255 B2
(45) Date of Patent: Nov. 11, 2014

(54) DAYLIGHT HARVESTING SHELF AND METHOD OF IMPROVING INTERIOR NATURAL LIGHT

(71) Applicant: Isamu James Yokota, Tonawanda, NY (US)

(72) Inventor: Isamu James Yokota, Tonawanda, NY (US)

( * ) Notice: Subject to any disclaimer, the term of this patent is extended or adjusted under 35 U.S.C. 154(b) by 0 days.

(21) Appl. No.: 13/892,735

(22) Filed: May 13, 2013

(65) Prior Publication Data

US 2013/0301134 A1     Nov. 14, 2013

Related U.S. Application Data

(60) Provisional application No. 61/646,595, filed on May 14, 2012.

(51) Int. Cl.

| | | |
|---|---|---|
| *G02B 17/00* | (2006.01) | |
| *F21S 11/00* | (2006.01) | |
| *G02B 19/00* | (2006.01) | |
| *E04F 10/00* | (2006.01) | |
| *E06B 9/24* | (2006.01) | |

(52) U.S. Cl.
CPC .......... *G02B 19/0042* (2013.01); *F21S 11/007* (2013.01); *G02B 19/0019* (2013.01); *E04F 10/005* (2013.01); *E06B 2009/2417* (2013.01); *E06B 9/24* (2013.01)
USPC .......................................... 359/591; 359/597

(58) Field of Classification Search
CPC ...................................................... F21S 11/007
USPC ................ 359/591, 597; 248/240; 52/204.66
See application file for complete search history.

(56) References Cited

U.S. PATENT DOCUMENTS

| | | | | |
|---|---|---|---|---|
| 1,434,075 | A * | 10/1922 | Van Schooneveld | 359/597 |
| 1,822,029 | A * | 9/1931 | Harvey | 359/597 |
| 4,035,539 | A * | 7/1977 | Luboshez | 428/178 |
| 4,448,187 | A * | 5/1984 | Stulken | 126/628 |
| 4,791,533 | A * | 12/1988 | Hane | 362/1 |
| 4,869,451 | A | 9/1989 | Gordon | |
| 5,775,655 | A * | 7/1998 | Schmeets | 248/240 |
| 5,980,052 | A * | 11/1999 | Thor et al. | 359/877 |
| 6,749,163 | B1 | 6/2004 | Lee | |
| 7,784,835 | B1 * | 8/2010 | Keays et al. | 285/261 |
| 7,940,460 | B2 | 5/2011 | Braunstein et al. | |
| 8,054,546 | B2 * | 11/2011 | Koster | 359/443 |
| 8,116,004 | B2 * | 2/2012 | Griffiths | 359/591 |
| 8,331,028 | B2 * | 12/2012 | Irudayaraj et al. | 359/591 |

* cited by examiner

*Primary Examiner* — Christopher Mahoney
(74) *Attorney, Agent, or Firm* — Daniel Boudwin; Global Intellectual Property Agency LLC

(57) ABSTRACT

A method and device for improving natural lighting within buildings is provided. The device comprises a controllable shelf having an upper, specular reflective surface for directing natural light into interior spaces and against interior ceilings. The shelves can be static or pivotable to redirect light based on the day and time of year. The pivotable shelf can be rotated downward or upwards to change the angle with which the light is reflected into the adjacent window, while its position is below the window and along the exterior of the building. This improves interior natural lighting and reduces electrical lighting costs using either a static shelf or movable shelf, wherein the assembly is deployable in a commercial or residential environment without blocking any naturally entering light through the window itself.

7 Claims, 4 Drawing Sheets

DAYLIGHT HARVESTING SHELF AND METHOD OF IMPROVING INTERIOR NATURAL LIGHT

CROSS REFERENCE TO RELATED APPLICATION

This application claims the benefit of Provisional Application No. 61/646,595 filed on May 14, 2012, entitled "Mirror Light Shelf." The above identified patent application is herein incorporated by reference in its entirety to provide continuity of disclosure.

BACKGROUND OF THE INVENTION

1. Field of the Invention

The present invention relates to window frames and devices for directing light into interior spaces. More specifically, the present invention pertains to a new and novel means of reflecting sunlight from exterior spaces into a building interior for improved natural lighting therein, wherein light is reflected upwards against an interior space ceiling for more pleasant interior lighting and for improved lighting and heating efficiency.

During the day light hours most people who spend their time indoors, particularly during the work week when most people are at their place of business. Most large commercial environments include office buildings, factories, hospitals, nursing homes, hotels, stores, and ware houses, while those that work from remain indoors at their residence. In order to work indoors during the day, electrical lighting is deployed to illuminate the building's interior spaces. Lighting therefore becomes a substantial use of energy in office and commercial settings, while residential setting consume slightly less energy because of the size of the space and the lighting requirements therein. This powered lighting is expensive, both in terms of actual cost to the business and in the environmental costs with respect to energy consumption.

Along with the costs of electric lighting, another drawback of the overuse of electrical lighting is the type of light created by most fluorescent and incandescent lamps in indoor spaces. This type of light can be harsh, overly bright, and overly unnatural to the user, while further not providing an indication of the exterior environmental conditions while the individual is inside the building. This lack of natural light can be draining and have an impact on the morale of workers, as natural light is softer, more refreshing and provides a feeling of being outdoors. Most buildings do not have a sufficient means of supplying natural lighting into interior spaces.

There exists a need, therefore, for improved interior lighting and for reduced lighting costs of indoor spaces in larger office settings and in residential homes. The costs of interior lighting can be extensive, particularly if the lights are continuously necessary and the technology deployed is less efficient than modern light alternatives. Reducing electrical costs can result in significant cost savings for the business or homeowner, while the energy impact of the user on the electrical grid is reduced. This reduction benefits all individuals as the environmental impact (i.e. the energy footprint) of the business or residence can be reduced, therefore reducing the amount of consumed nonrenewable resources required to maintain lighting therein.

It is also recognized that the use of natural lighting in interior spaces improves the mood of those therein. This is true in a business setting and in a residential setting, where natural light is more refreshing than electrical lighting and can improve morale, work output, and overall happiness. This can result in improved worker efficiency, increased happiness at the workplace, and improved mental health in all environments.

The present invention provides a means and method of directing natural sunlight into interior spaces. The device contemplates the use of a specular (mirror-like) reflective surface that redirects natural sunlight into interior spaces and against ceiling surfaces for improving the natural lighting within the building. The present invention considers several embodiments for its application, including simpler residential solutions and more elaborate solutions for commercial and large office building settings. The device comprises a supported mirror placed below an existing window, wherein the mirror is statically situated or pivotable to direct sunlight during the day against interior ceiling surfaces within the building interior. The device is mounted along the exterior of the building and is below the window, preventing any blockage of natural light entering through the window itself. The natural light is redirected onto the ceiling surface, which is a diffuse reflective surface that spreads the natural light throughout the room. This reduces the overall need for electrical lighting during periods of abundant outdoor light. Overall, the present invention is provided to reduce energy costs, improve natural lighting in interior spaces, and to reduce costs to businesses and homeowners.

2. Description of the Prior Art

Devices have been disclosed in the prior art that relate to sunlight reflective devices and window shelves. These include devices that have been patented and published in patent application publications, and generally relate to static sunlight reflectors and static shelving for window frames. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 4,869,451 to Gordon discloses a window shelf for pets and flowers that comprises a planar, rectangular body having a near edge resting on the window sill and an angular, movable support brace that supports the shelf body in a horizontal position. The brace, wall, and shelf body form a right triangle, while the shelf provides space for pets or potted plants to be rested thereon. U.S. Pat. No. 6,749,163 to Lee discloses a window sill extension that includes a display deck and a support bracket for extending the usable area below a window. A closed window secures the display deck as a stable platform when deployed. Both the Gordon and Lee devices describe a type of window sill support that is now well known in the art. Both are representative of a window sill extension for use as a support. While providing an extension from a window sill, the present invention utilizes a window sill extension as a means to redirect light into interior spaces rather than one for support of other objects thereon.

U.S. Pat. No. 7,940,460 to Braunstein discloses a light shelf assembly having two spaced apart supports that are adapted to support a lighted surface below a window in a cantilevered position. The light shelf reflects light upward, while the sides of the shelf include channels to accept the channel supports therein. The shelf is supported in a horizontal position along the channels, whereby they may be released from the channels and pivoted downward into a vertical position. The connection with the side supports does not allow for adjustment of the light shelf position other than for moving the shelf between a completely horizontal working position and a vertical, stowed position where no effective intermediate angles are possible. The present invention contemplates a movable assembly that can adjust for changing light conditions and maintain a beam of light into the interior space through the adjacent window.

Finally, U.S. Pat. No. 8,116,004 to Griffiths discloses a reflective light shelf that is rigidly mounted to a window frame. The device comprises an outer reflective surface and an inner core structure, whereby the device is fastened to a window to reflect sunlight thereinto. A mounting bracket is utilized to secure the assembly, whereafter the shelf is supported in a horizontal configuration. Similar to the Braunstein device, the Griffiths device provides a relatively simple shelf structure for statically reflecting light into a room interior.

The present invention provides an exteriorly mounted, lower window frame shelf that includes a specular reflective upper surface to direct sunlight into interior spaces and against an interior ceiling. The shelf is preferably a pivotable structure that can move shifted to adjust for the position of the sun during the day and throughout the year, while the location and use of a specular reflective surface reduces glare into the interior space. It is submitted that the present invention substantially diverges in design elements from the prior art, and consequently it is clear that there is a need in the art for an improvement to existing window frame shelf devices. In this regard the instant invention substantially fulfills these needs.

SUMMARY OF THE INVENTION

In view of the foregoing disadvantages inherent in the known types of window frame shelves now present in the prior art, the present invention provides a new shelf that can be utilized for providing convenience for the user when reflecting exterior light into a building through a window, wherein the interior space is provided improved natural lighting for enjoyment and for reduced lighting costs.

It is therefore an object of the present invention to provide a new and improved window frame shelf device that has all of the advantages of the prior art and none of the disadvantages.

It is another object of the present invention to provide a window frame shelf device that includes a specular reflective upper surface for directing sunlight through an adjacent window, whereby the incident light is reflected at a defined angle therefrom to prevent glare or diffuse light scatter.

Another object of the present invention is to provide a window frame shelf device that directs sunlight against an interior ceiling surface, whereby the light is spread throughout the interior as it is diffusely spread from the ceiling.

Yet another object of the present invention is to provide a window frame shelf device that improves natural interior lighting and reduces electrical lighting needs during daylight periods.

Another object of the present invention is to provide a window frame shelf device that can be pivoted to direct light into the adjacent window during all periods of the day, wherein the shelf is adjustable such that light is consistently directed against an interior ceiling regardless of the season or time of day.

Another object of the present invention is to provide a window frame shelf device that can be deployed in a commercial or residential setting, wherein the device can improve natural lighting therein for improving mood, reducing energy costs, and for improving visibility within interior spaces.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
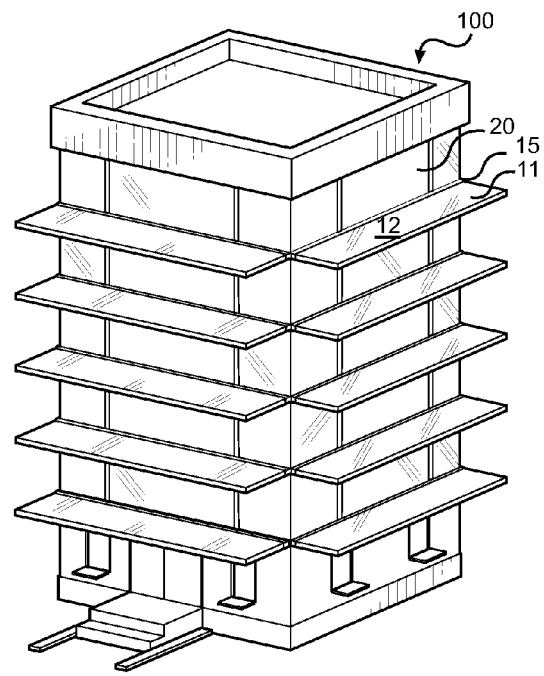
FIG. 1 shows a typical commercial deployment of the present invention, wherein a plurality of reflective shelves is deployed along the base of window frames to direct sunlight into the building.

Reference is made herein to the attached drawings. Like reference numerals are used throughout the drawings to depict like or similar elements of the light redirecting window frame shelf device. For the purposes of presenting a brief and clear description of the present invention, the preferred embodiment will be discussed as used for directing natural light into interior spaces from the base of a window sill, wherein the device utilizes a specular reflective surface to eliminate glare or light scatter. The figures are intended for representative purposes only and should not be considered to be limiting in any respect.

Figure 2:
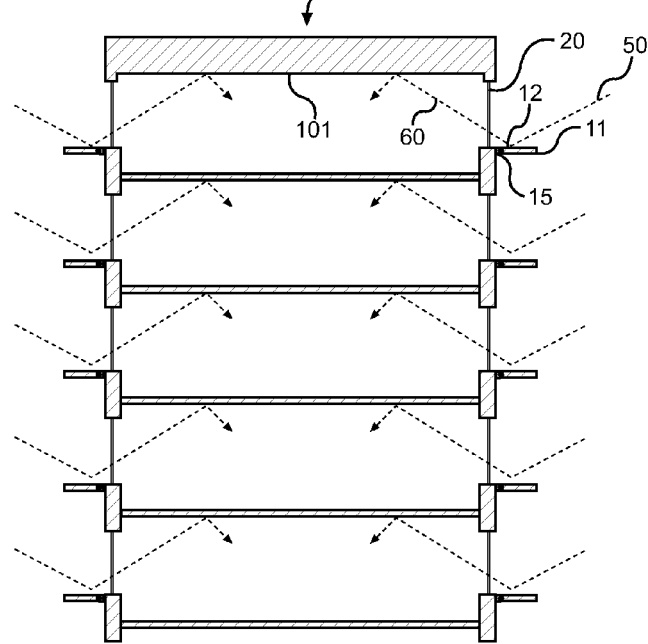
FIG. 2 shows a cross section of the commercial deployment of the present invention.

Referring now to FIGS. 1 and 2, there is shown a view of the present invention in a working position in a typical commercial deployment situation. The device of the present invention is one that directs sunlight into interior spaces by way of a specular reflective surface 12, whereby the light is directed along a defined pathway and not indiscriminately scattered such that it would create a glare or diffuse light that could be disruptive to those indoors. Ideally in a commercial setting, such as a large office building 100 with several floors and windows, a plurality of exteriorly mounted shelves 11 are deployed along the base of the window 20. Downward light reflects off of the reflective, mirror-like upper surface 12 and through the adjacent window 20. The light is directed against an interior ceiling 101, whereafter the light can be diffused by the interior walls such that the overall lighting the in the interior space is improved, natural light is introduced, and the need for electrical lighting is reduced.

In a preferred embodiment, each of the shelves 11 are positioned along the base of the window frame and are pivotably attached by way of a hinge 15, whereby the shelf 11 can be angled with respect to the building exterior either manually or by remote. This allows for adjustment based on the position of the sun during the day and throughout the year. Placement at the base of the window also prevents any sun blockage through the window 20 itself, wherein the shelf 11 is positioned below the window so as not to create any visual interference of the window view.

The upper surface 12 of each shelf comprises a specular reflective surface, such as a mirror surface, whereby the incident light 50 is reflected 60 away at the same angle and is not scattered. This is a critical element, as the light 60 directed indoors is ideally directed against a ceiling 101 surface and the light is reflectively spread therefrom. If the upper surface 12 were a diffuse reflector, glare and randomly scattered light could hurt the eyes of those indoors and could be distracting thereto.

As provided in FIGS. 1 and 2, the commercial deployment contemplates a shelf 11 for each level, whereby each floor is accommodated with natural light. Surrounding the building with the shelves greatly increases the amount of light and energy entering the building, which can reduce lighting costs and even heating costs for the business. Overall, the device provides an interior lighting scheme that is more natural, smoothing, and one that can reduce the necessity of artificial lighting sources that can be harsh to the eyes.

Figure 3:
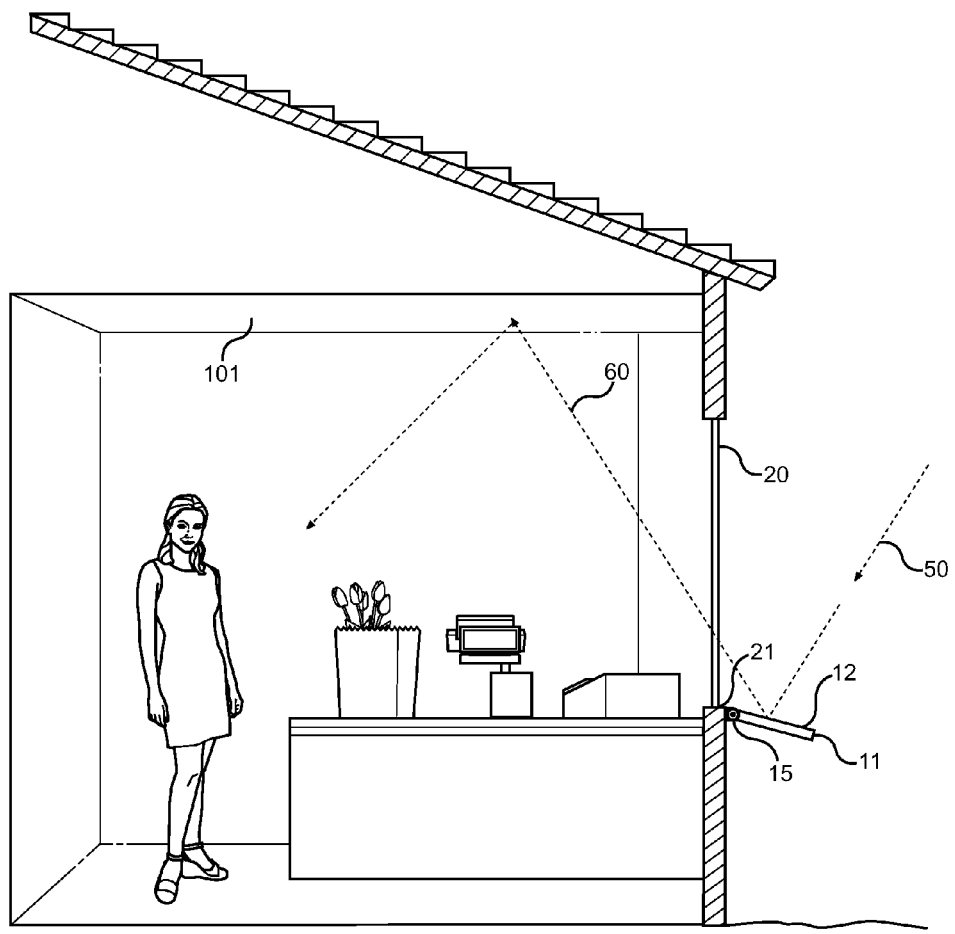
FIG. 3 shows a pictorial view of the shelf device in operation.
Figure 4:
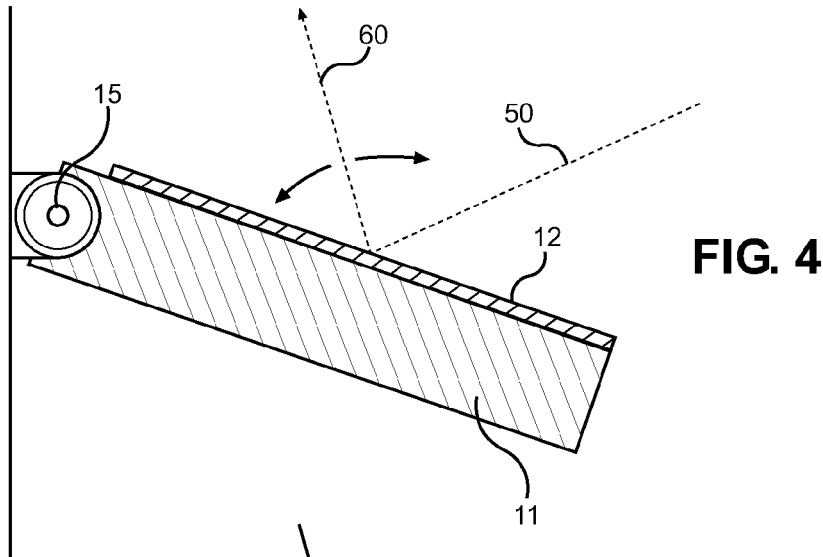
FIG. 4 shows a cross section view of the shelf device, wherein the shelf is pivotable from its connection to the building below an adjacent window.

Referring now to FIGS. 3 and 4, there is shown a view of the shelf 11 pivotably connected to the base 21 of a window 20. Incoming light 50 is reflected inwards 60 and against the interior ceiling 101 for improved natural light indoors. In a residential environment, a user can simply open the window 20 and adjust the positioning of the shelf 11 by changing is position relative to the hinge joint 15. This changes the angle of the incoming light 60 and adjusts for changes in the sun's location in the sky. Use of the specular reflective upper surface 12 causes light to reflect 60 at the equal and opposite angle with which it approached 50 the surface 12. Therefore, changes in the shelf angle by way of the hinge 15 adjust the light reflection 60 into through the window. Since the shelf 11 is positioned below the window 20, light is not reflected inwards at an angle that could disrupt vision, while further the specular reflective (mirror) surface 12 prevents light scatter and glare.

Figure 5:
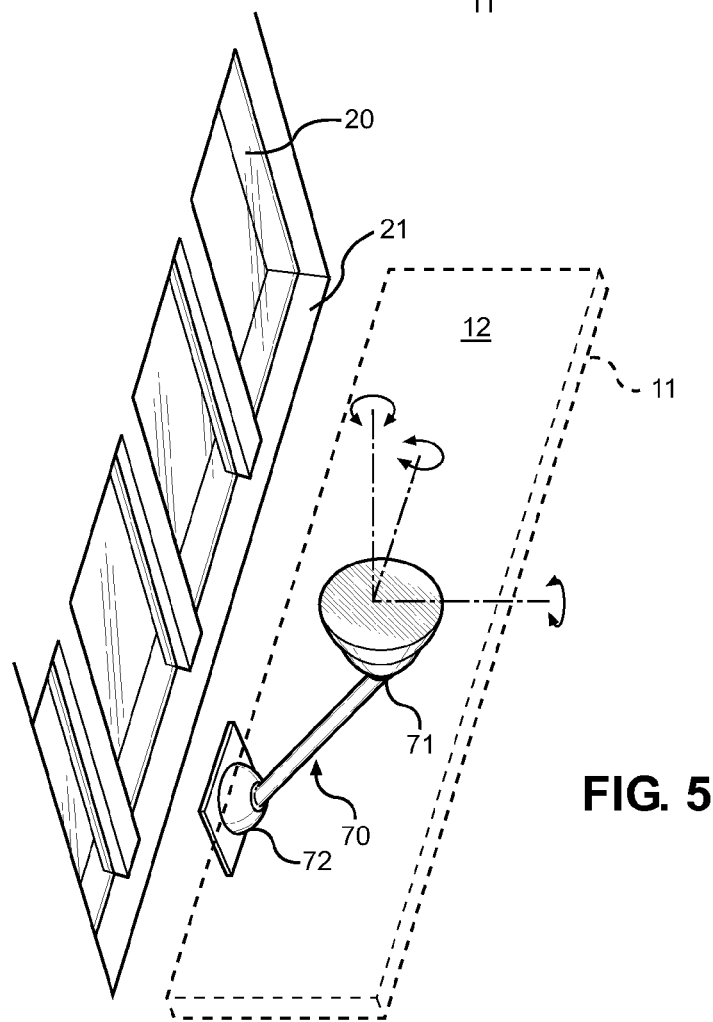
FIG. 5 shows an alternate embodiment of the present invention wherein the device can be pivoted in multiple degrees of freedom to adjust for changing sun positions throughout the day and the year.

Referring now to FIG. 5, there is shown an alternative embodiment of the present invention, wherein a pivotable stand 70 is provided in support of the shelf 11 rather than a hinge joint. A pivotable connection provides more degrees of freedom for the shelf 11 and thus allows for tilting, pivoting, and pitching thereof to direct the upper surface 12 towards the position of the sun, wherein the sun's position changes in the sky relative to the shelf 11 and its support wall. In one embodiment, the stand 70 comprises a first 72 and second 71 ball joint attachment along the ends of a support shaft. The first joint 72 is connected to the adjacent wall below the window 20 and window frame 21, while the second pivot joint 71 connects to the base of the shelf 11.

Figure 6:
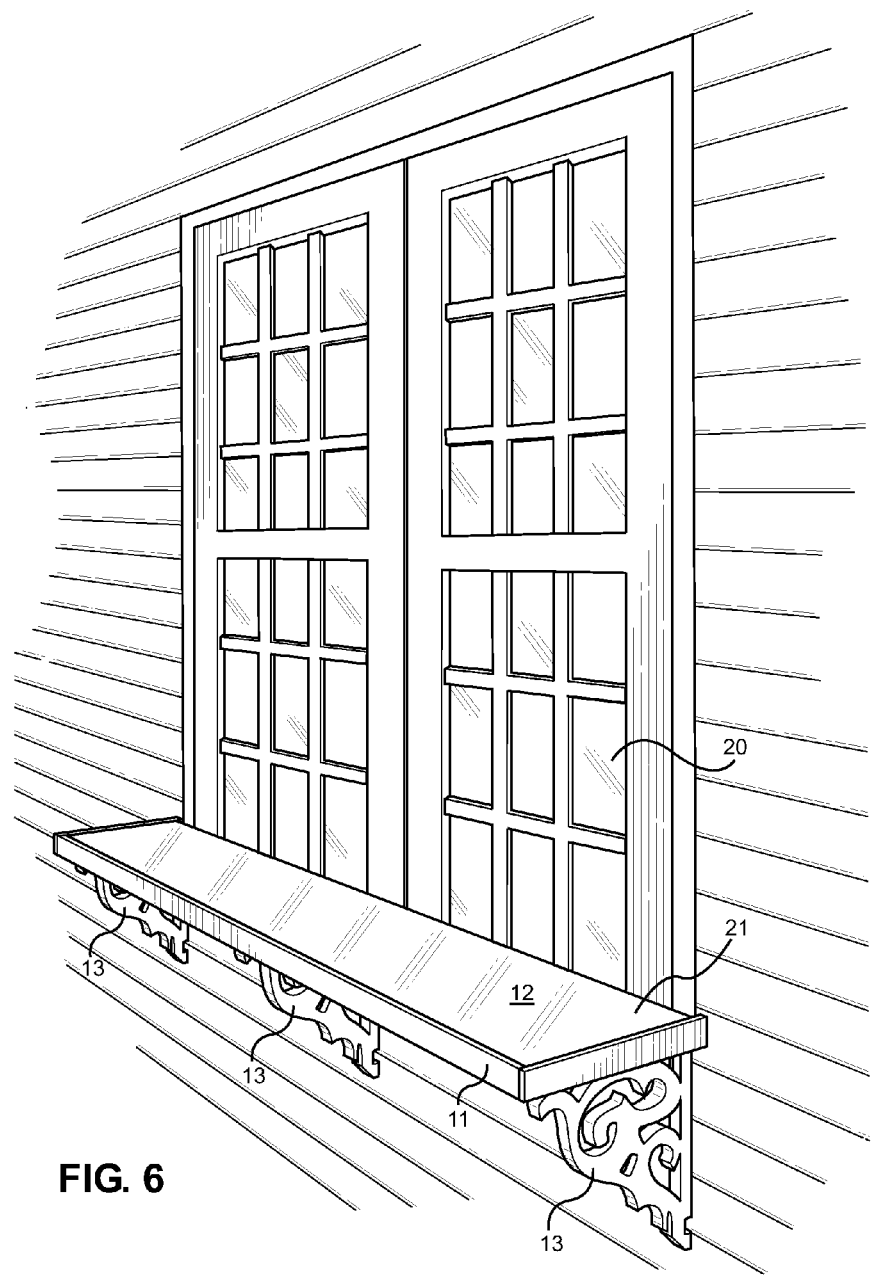
FIG. 6 shows a view of a static embodiment of the present invention in a residential deployment situation.

Referring finally to FIG. 6, there is shown a static embodiment of the present invention, wherein the mirrored 12 shelf 11 is positioned along the base 21 of a window frame and below an existing window 20. This embodiment is the simplest form of the invention, wherein the specular reflective upper surface 12 is either supported by support trusses 13 or is cantilevered from below the window 20 such that light is directed through the window 20 during daylight hours.

In any of the embodiments, the shelf 11 comprises an elongated structure having a planar upper surface supporting a specular reflective surface thereon. The length of the device is such that it spans the width of the window, while the width of the device defines the shelf distance from the building exterior. The greater the width, the more light can be reflected into the interior space. The preferred embodiment is a substantially rectangular structure having a minor thickness and an enlarged surface area defined by its length and width for reflecting light therefrom. While a planar reflective surface is preferred, it is also contemplated that the present invention may be upwardly convex to expand its overall area and therefore the overall area of reflected light therefrom.

The present invention is a daylight harvesting device that brings an abundance of free and natural daylight into the interior space through the windows of homes and buildings. The device promotes brighter and healthier living and working spaces while reducing the use of artificial light. It provides a way to bring more natural light into an interior space and through an existing window. It can also harvest heat from sunlight during the colder seasons, which reduces heating costs. Since the electricity that lighting uses is largely created by way of nonrenewable resources, ultimately the present invention this a small solution for reducing a business or residence's carbon footprint.

The present invention is a shelf which can be placed along the exterior of the building and along the base of a window frame and below an existing window. The shelf includes a mirrored upper surface that reflects daylight (light from the sun) into the building through the window. By placing the device at the base of the window and along the exterior, the downward-directed light from the sky reflects off of the mirror and changes its direction (the angle of reflection is equal to the angle of incidence of the incoming light), entering the interior space for improved lighting therein. The reflected light travels through the window and is diffused along the opaque ceiling of the interior space. The light that hits the ceiling brightens the entire ceiling and the overall interior space. The light that hits the ceiling will scatter in every direction to brighten the interior space. In this way, the present invention acquires more natural daylight into the interior of the building, which can make living and working space brighter. Consequently, occupants do not have to resort to artificial lights with as much frequency during the day, which reduces the use of electricity.

The present invention can be made out of wood, plastic, metal or any material that can withstand heat, cold, rain, snow and other environmental forces. The invention may be supported with a fixed bracket or adjustable support that can allow a user to move it manually or automatically to reflect light. The material of the device can made to match the material of the house or building, and it can be decorative and paintable.

A commercial embodiment of the present invention may include a remote operated, electrically powered support, whereby the hinge joint is powered by way of electric motors to control the inclination of the shelf with respect to the building exterior. This embodiment provides for use in buildings where the windows provide no access to the exterior, allowing changes to the shelf position by remote or by programmed control. Along with adjusting for different sun angles, the change in angle of the invention can also help maintain and clean the surface from debris and standing moisture.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sunlight reflection shelf, comprising:
    an elongated shelf body having a substantially rectangular shape with a length, a width, a thickness, an inner edge, an outer edge, and an upper surface;
    said inner edge of said shelf adapted to be connected to a building exterior and below an adjacent window;
    said length of said shelf adapted to span said window width;
    said upper surface of said shelf comprising a specular reflective surface adapted to reflect sunlight through said adjacent window at an upward angle against a building interior ceiling;
    wherein said shelf is adapted to leave said window unobstructed;
    said inner edge being pivotably attached to said building exterior.

2. The device of claim 1 wherein said shelf pivotable connection is motorized and adapted to receive input from a remote control to adjust said shelf orientation without physical contact therewith.

3. A sunlight reflection shelf, comprising:
    an elongated shelf body having a substantially rectangular shape with a length, a width, a thickness, an inner edge, an outer edge, and an upper surface;
    said shelf being pivotably connected to a building exterior and below an adjacent window;
    said length of said shelf adapted to span said window width;
    said upper surface of said shelf comprising a specular reflective surface adapted to reflect sunlight through said adjacent window at an upward angle against a building interior ceiling;
    wherein said shelf is adapted to leave said window unobstructed;
    said pivotable shelf connection adapted to allow at least two degrees of freedom when adjusting said shelf orientation.

4. The device of claim 3, wherein said pivotable shelf connection further comprises a pivotable stand having a first and second ball joint, said first ball joint secured to said building exterior and said second ball joint secured to said shelf, said stand adapted to allow adjustment of said shelf in six degrees of freedom.

5. The device of claim 4, wherein said shelf pivotable connection is motorized and adapted to receive input from a remote control to adjust said shelf orientation without physical contact therewith.

6. A sunlight reflection shelf, comprising:
    an elongated shelf body having a substantially rectangular shape with a length, a width, a thickness, an inner edge, an outer edge, and an upper surface;
    said inner edge of said shelf adapted to be connected to a building exterior and below an adjacent window;
    said length of said shelf adapted to span said window width;
    said upper surface of said shelf comprising a specular reflective surface adapted to reflect sunlight through said adjacent window at an upward angle against a building interior ceiling;
    wherein said shelf is adapted to leave said window unobstructed.

7. The device of claim 6, further comprising at least one angled shelf support truss for supporting said shelf.

* * * * *